(12) United States Patent
Morris et al.

(10) Patent No.: US 8,839,288 B2
(45) Date of Patent: Sep. 16, 2014

(54) SYSTEM FOR PRESENTING COLLATERAL INFORMATION TO MOBILE DEVICES

(75) Inventors: Nadia Morris, Decatur, GA (US); Stephen Rys, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 349 days.

(21) Appl. No.: 12/962,010

(22) Filed: Dec. 7, 2010

(65) Prior Publication Data

US 2012/0144418 A1 Jun. 7, 2012

(51) Int. Cl.
| | |
|---|---|
| *H04N 7/10* | (2006.01) |
| *H04H 60/33* | (2008.01) |
| *H04H 60/32* | (2008.01) |
| *H04N 21/41* | (2011.01) |
| *H04N 21/433* | (2011.01) |
| *H04N 21/43* | (2011.01) |

(52) U.S. Cl.
CPC ....... *H04N 21/4333* (2013.01); *H04N 21/4126* (2013.01); *H04N 21/4302* (2013.01)
USPC ................... 725/32; 725/10; 725/13; 725/20; 725/36

(58) Field of Classification Search
USPC ..................... 725/10, 13, 20, 32, 36
See application file for complete search history.

(56) References Cited

U.S. PATENT DOCUMENTS

| | | | |
|---|---|---|---|
| 6,816,858 B1 | 11/2004 | Coden et al. | |
| 6,873,314 B1 * | 3/2005 | Campbell | 345/156 |
| 2002/0162121 A1 * | 10/2002 | Mitchell | 725/135 |
| 2005/0262539 A1 * | 11/2005 | Barton et al. | 725/90 |
| 2010/0162288 A1 * | 6/2010 | Huffman et al. | 725/22 |
| 2010/0186057 A1 * | 7/2010 | Hardacker et al. | 725/110 |
| 2010/0205628 A1 * | 8/2010 | Davis et al. | 725/25 |
| 2011/0103763 A1 * | 5/2011 | Tse et al. | 386/201 |
| 2012/0011541 A1 * | 1/2012 | McCarthy | 725/35 |

* cited by examiner

*Primary Examiner* — Gigi L Dubasky
(74) *Attorney, Agent, or Firm* — Guntin & Gust, PLC; Joseph P. Hrutka

(57) ABSTRACT

A system that incorporates teachings of the present disclosure may include, for example, a tangible computer-readable storage medium having computer instructions to receive from a media processor a time-sensitive code embedded in a video stream received and presented by the media processor at a presentation device, retrieve collateral information associated with a scene of the video stream according to the time-sensitive code, and transmit the collateral information to a mobile communication device. Other embodiments are disclosed.

20 Claims, 15 Drawing Sheets

200

700

800

SYSTEM FOR PRESENTING COLLATERAL INFORMATION TO MOBILE DEVICES

FIELD OF THE DISCLOSURE

The present disclosure relates generally to presentation techniques and more specifically to a system for presenting collateral information to mobile devices.

BACKGROUND

With the wide availability and variety of mobile devices, it is common for consumers to utilize a mobile device such as a smart phone or electronic tablet while viewing a television show or movie. Some users, for example, engage in texting or Internet browsing while the TV program is in play.

DETAILED DESCRIPTION

The present disclosure describes, among other things, illustrative embodiments for transmitting to a mobile communication device collateral information associated with a media program while the media program is being presented. Other embodiments are contemplated by the present disclosure.

One embodiment of the present disclosure includes a set-top box having a memory, and a processor coupled to the memory. The processor can be adapted to receive a video stream, detect a time-sensitive code in the video stream, and transmit the time-sensitive code to a server that transmits to a mobile communication device collateral information associated with a scene in the video stream associated with the time-sensitive code.

One embodiment of the present disclosure includes a tangible computer-readable storage medium having computer instructions to receive from a media processor a time-sensitive code embedded in a video stream received and presented by the media processor at a presentation device, retrieve collateral information associated with a scene of the video stream according to the time-sensitive code, and transmit the collateral information to a mobile communication device.

One embodiment of the present disclosure includes a communication device having a memory, and a processor coupled to the memory. The processor can be adapted to receive collateral information associated with a video stream received and presented by a media processor responsive to the media processor detecting a time-sensitive code in the video stream, detect a need to pause the presentation of the video stream by the media processor, and transmit a request to pause the presentation of the video stream.

Figure 1:
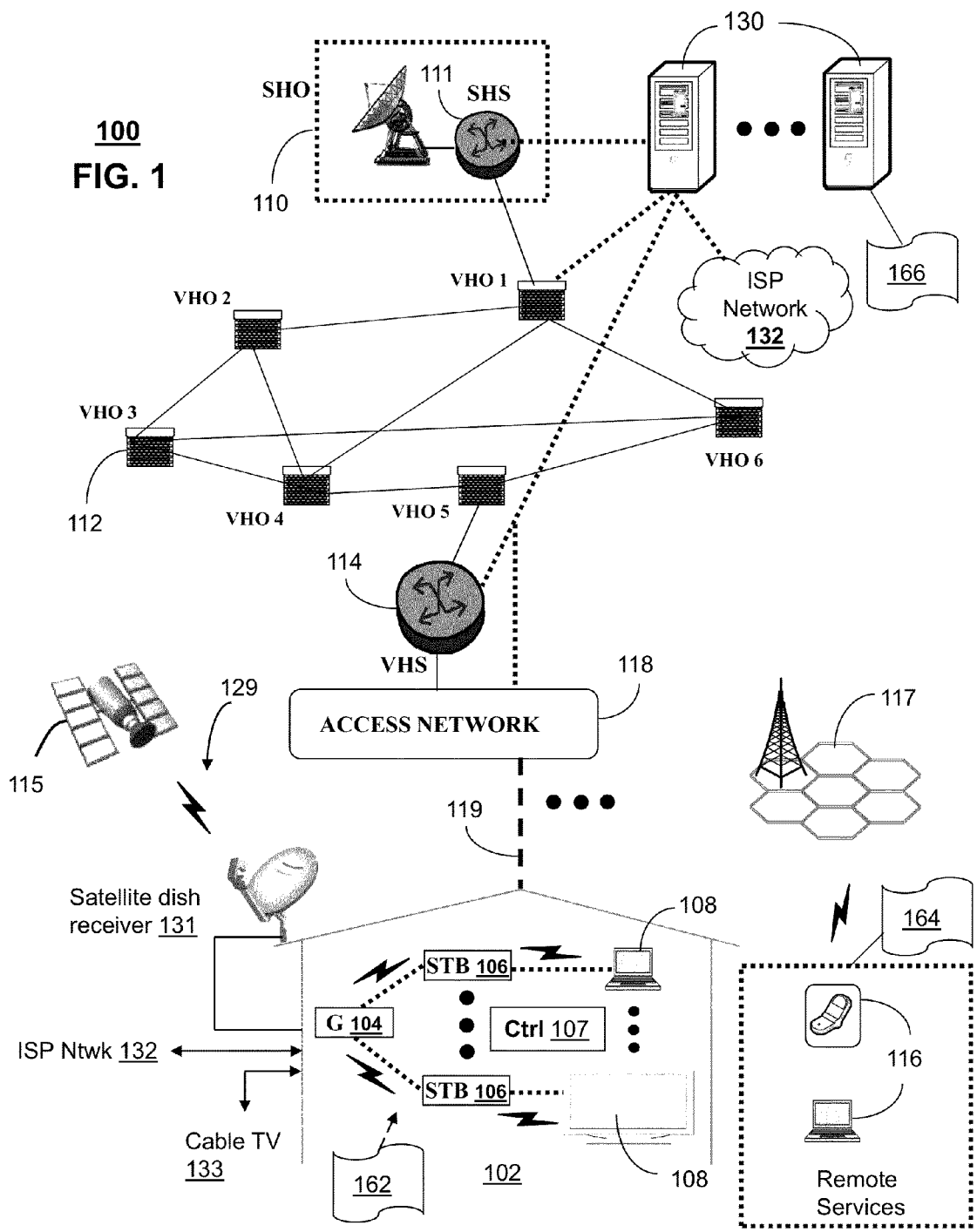
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on). Other present and next generation wide area wireless network technologies are contemplated by the present disclosure.

Communication system 100 can also provide for all or a portion of the computing devices 130 to function as a server or servers (herein referred to as server 130). The server 130 can use common computing and communication technology to perform function 166, which among things, causes the server 130 to interact with the STB 106 according to function 162. The interactions between the server 130 and the STB 106 according to functions 166 and 162, respectively, can cause the server 130 to supply collateral information to a portable communication devices 116 of FIG. 1, which processes the collateral information according to function 164.

Illustrative embodiments of functions 162, 164 and 166 are described in methods that follow.

Figure 2:
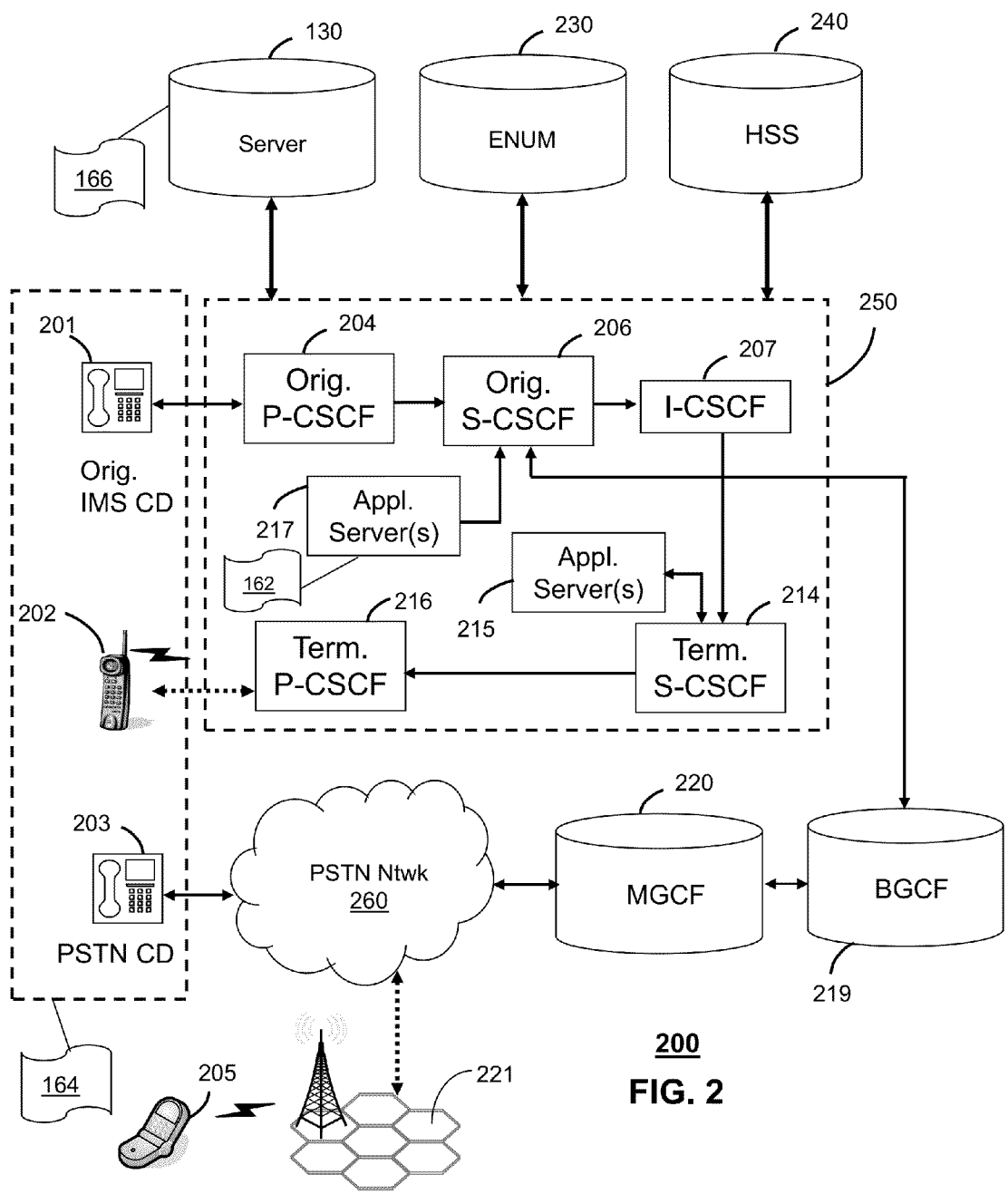

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding no answer, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1. It is further contemplated that the CDs of FIG. 2 can operate as wireline or wireless devices. For example, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant devices. In this embodiment, the cellular base station 221 may communicate directly with the IMS network 250.

The server 130 of FIG. 1 can be operably coupled to communication system 200 for purposes similar to those described above. It is further contemplated that server 130 can perform function 166 and thereby interact with the application server 217 performing function 162 and communication devices 201, 202 and 203 performing function 164 as previously described by the embodiments of FIG. 1.

Illustrative embodiments of methods that can operate in portions of the devices of FIG. 2 are described below.

Figure 3:
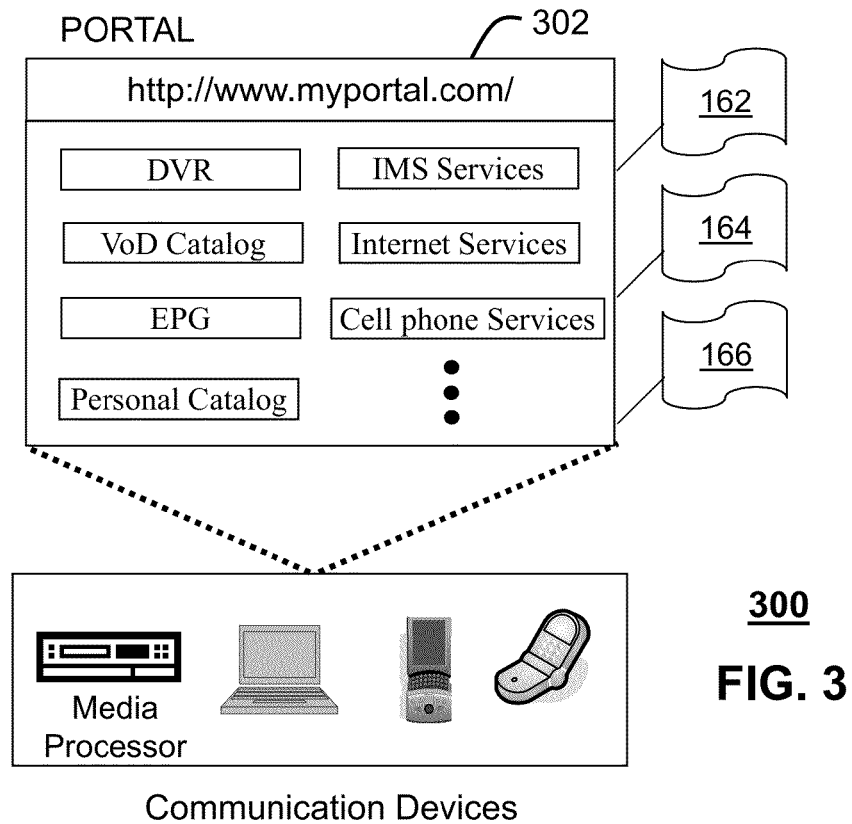
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored in the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162, 164, 166 of the STB 106, portable communication devices 116 and server 130, respectively.

Illustrative embodiments of methods that can operate in portions of the web portal 302 of FIG. 3 are described below.

Figure 4:
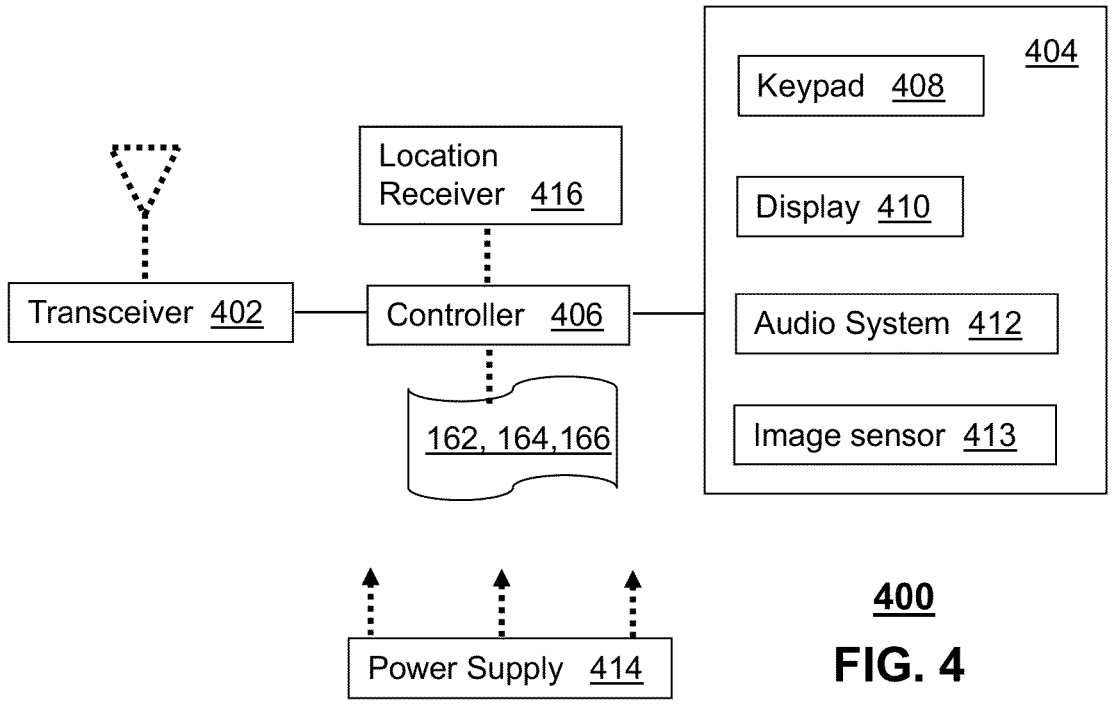
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with its navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is further contemplated that the communication device 400 can operate as an STB, a portable communication device or a server performing the functions 162, 164, and 166 as described earlier.

Illustrative embodiments of methods that can operate in portions of the communication device of FIG. 4 are described below.

Figure 5:
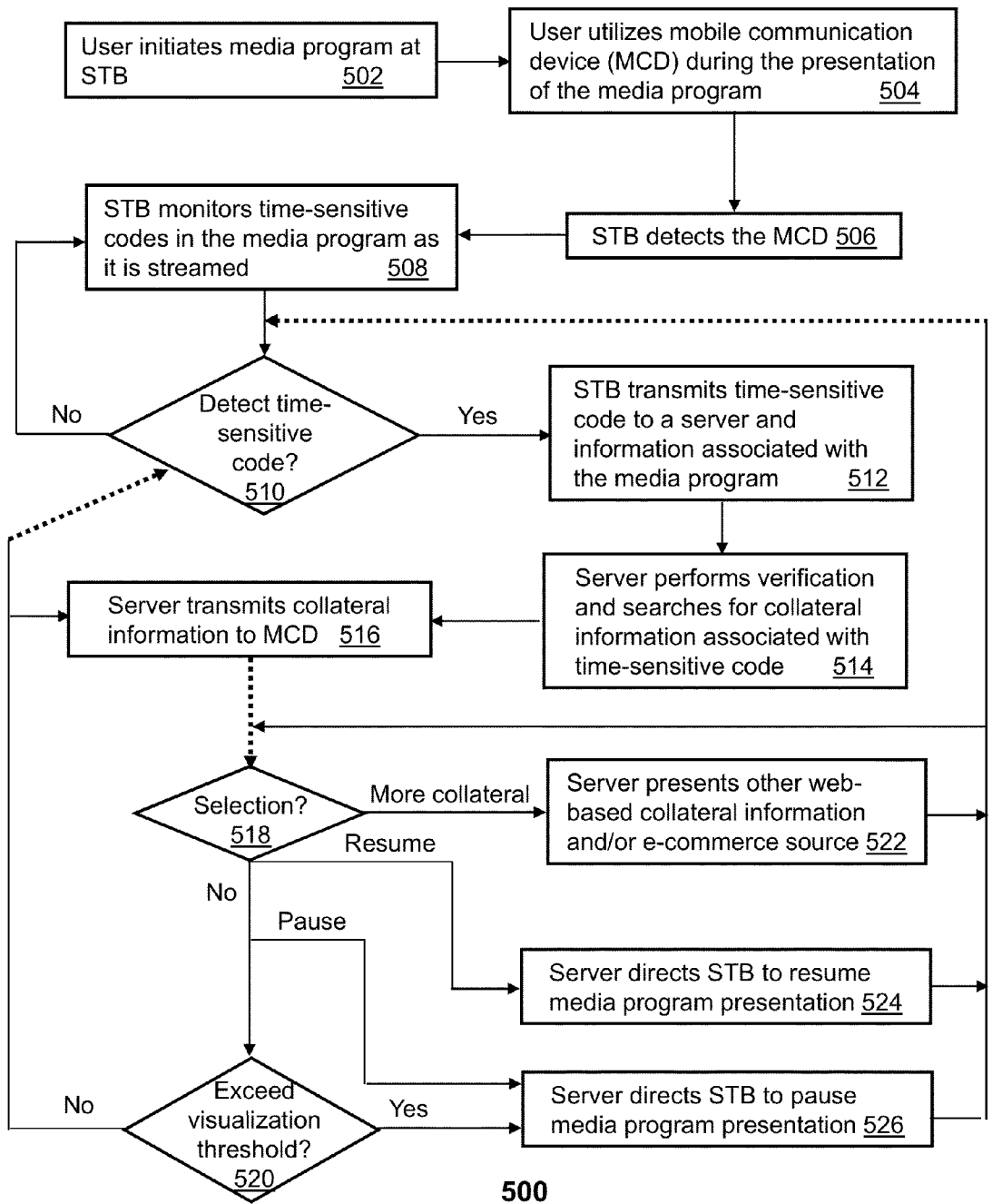
FIG. 5 depicts illustrative embodiments of a method operating in portions of the systems described in FIGS. 1-4.

FIG. 5 depicts an illustrative method 500 that describes operations of one or more devices of FIGS. 1-4. Method 500 can begin with step 502 in which a user initiates a media program at an STB 106. This step can represent a user selecting with a remote controller a TV or movie to watch on a television set. At step 504, the user can choose to utilize a mobile communication device 116 such as a tablet (e.g., iPAD™) or smart phone (e.g., iPhone™) while viewing the media program presented on the TV set. The STB 106 can be adapted at step 506 to detect the presence of the mobile communication device with discovery techniques available in wireless communication technology such as a WiFi or Bluetooth. With such technology, the STB 106 can detect, for example, when mobile communication device 116 has roamed into a WiFi or Bluetooth network accessible by the STB 106. Once the mobile communication device 116 has been detected, the STB 106 can be adapted to monitor time-sensitive codes in the media program as it is streamed by a media source such as a VHS 114 to the STB 106.

Figure 6:
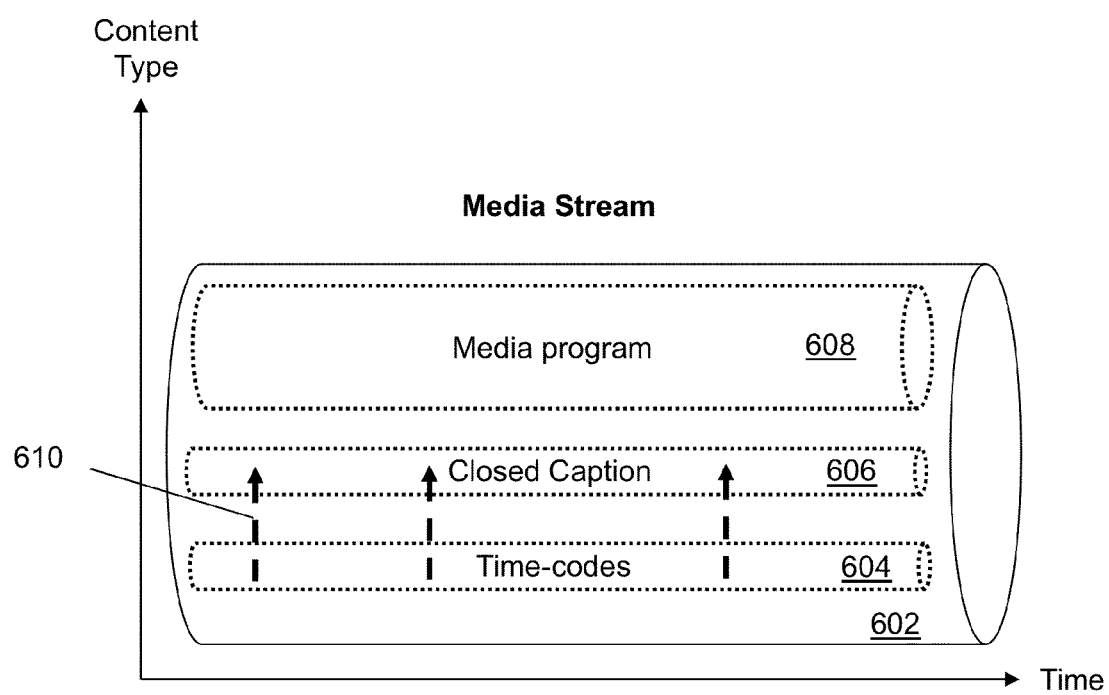
FIG. 6 depicts an illustrative embodiment of a media stream operating according to the method of FIG. 5.
Figure 7:
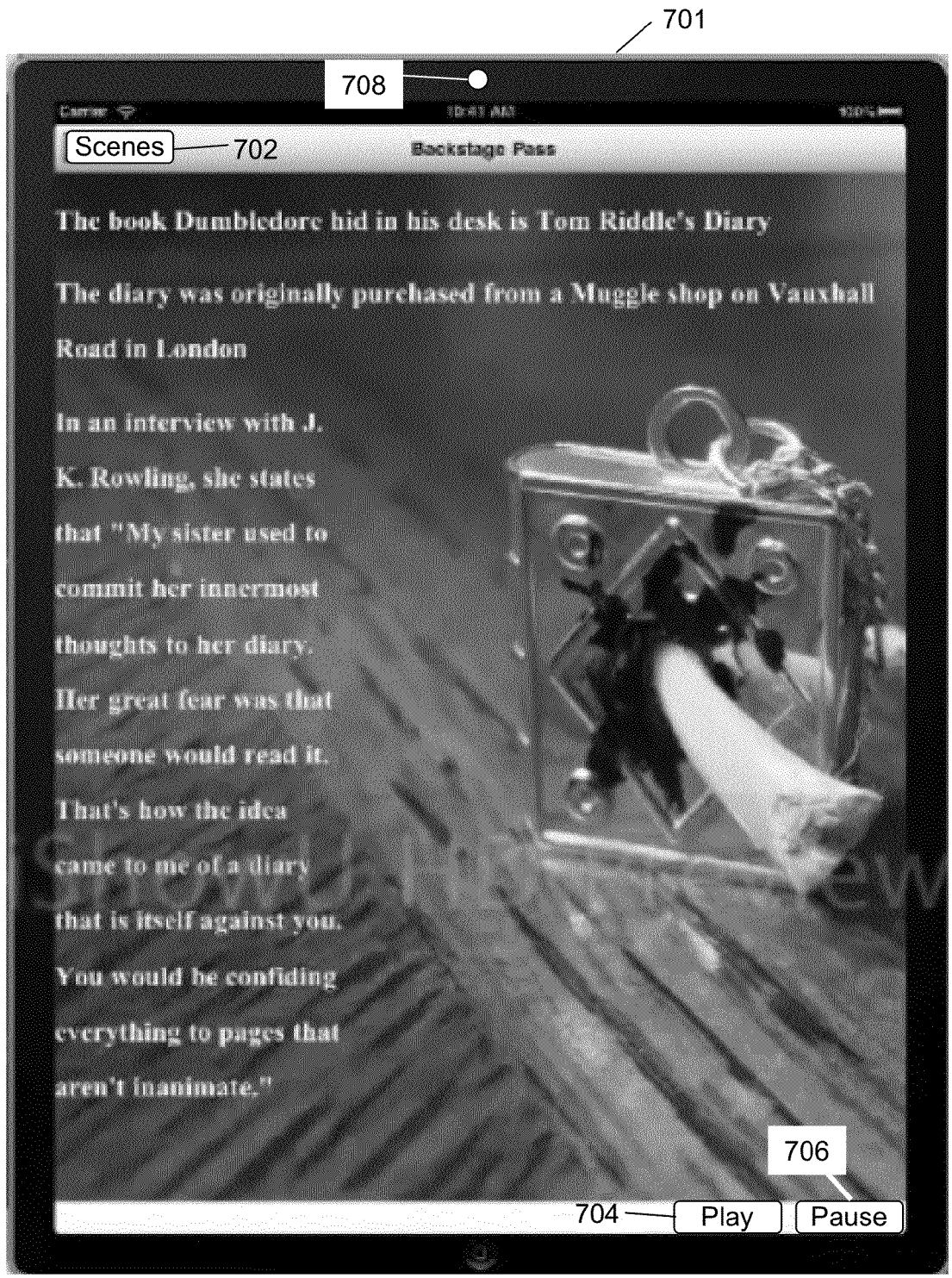
FIGS. 7-15 depict illustrative embodiments of a graphical user interface presented by a communication device according to the method of FIG. 5.

FIG. 6 depicts a media stream 602. The media stream 602 can include sub-component streams such as the media program (e.g., TV or movie) 608, closed caption stream 606, and/or time codes stream 604. The closed caption stream 606 can be invoked by the STB 106 upon detecting the mobile communication device 116 at step 506 while suppressing a presentation of the closed caption stream 606 at the presentation device (e.g., TV set). Time code stream 604 can include media program counter data that indicates a position in time in the media program 608.

Time-sensitive codes 610 can represent a detectable coding scheme such as digital codes based on binary sequences, text strings, alphanumeric characters or other suitable forms of identifiable codes. Each code 610 can be unique and can be repeated when desired. Each code 610 can be inserted in the closed caption stream 606 or the time code stream 604 at specific instances in time which may have relevance to one or more scenes depicted by the media program. The STB 106 can be adapted to detect time-sensitive codes 610 according to a distinct header or flag included in each code 610 to distinguish it from other information supplied in the closed caption stream 606 or the time code stream 604. The STB 106 can be adapted to suppress a presentation of time-sensitive codes 610.

At step 510, the STB 106 can monitor time-sensitive codes embedded in either the closed caption stream 606, the time code stream 604 or combinations thereof. Once a time-sensitive code 610 is detected, the STB 106 can proceed to step 512 where it transmits to server 130 the detected time-sensitive code 610 (or a derivative thereof) and information associated with the media program 608. The media program information can include metadata describing the media program such as the media program title (e.g., Mission Impossible III), the channel and time when the media program started, and so on.

At step 514, the server 130 can be adapted to verify from the media program information and the time-sensitive code 610 that collateral information is available. For example, certain sponsors of the collateral information may choose to provide collateral information for media programs viewed on specific channels and at specific viewing periods. It should be noted that even if time-sensitive codes 610 are supplied with the media program, a producer of collateral information can enable or disable presentation of collateral information according to policies applied to the server 130 for determining from the media program information and the time-sensitive codes 610 whether collateral information should be made available to the mobile communication device 116.

Once the server 130 verifies that the media program information and time-sensitive code 610 satisfy policies of the producer (or distributor) of collateral information, the server 130 proceeds to step 514 where it searches for collateral information utilizing at least in part the time-sensitive code 610 supplied by the STB 106. The collateral information can be searched in a local or remote database which can be indexed by the time-sensitive code and if desired all or a portion of the media program information supplied in step 512.

Collateral information in the present context can represent without limitation information associated with an animated object in a media program scene, information associated with an inanimate object in the media program scene, advertisement contextually associated with media program scene, or other forms of identifiable information including audible or visible information presented by the media program. The animated object can be human or synthesized animation. The inanimate object can be an object distinguishable in the scene such as furniture, a soda can, a painting, or other objects which may be of interest to a user. Advertisements or promotions can be contextually sensitive to a scene. In the present context a scene can mean a single picture frame, or a sequence of picture frames which constitute a still or moving image portion of the media program.

At step 516, the server 130 transmits the collateral information to the mobile communication device 116 over a communication medium such as the ISP network 132 or a data channel of the cellular network 117 shown in FIG. 1. Prior or during this step, the mobile communication device 116 may be prompted by the server 130 to register with the server 130. Alternatively, the STB 106 can direct the mobile communication device 116 to register with the server 130 at the time the STB 106 discovers the presence of the mobile communication device 116. Registration may be automated, or may require the user of the mobile communication device 116 to present authentication data such as a login and/or a password.

FIGS. 6-15 provide non-limiting illustrative embodiments of collateral information which the server 130 can supply to the mobile communication device 116. For instance, suppose the STB 106 detects a time-sensitive code 610 while a user is viewing a Harry Potter movie. The time-sensitive code 610 can be associated with a particular scene that causes the server 130 to retrieve collateral information shown in FIG. 7 which describes "Tom Riddle's Diary" upon receiving the time-sensitive code 610 from the STB 106. The collateral information of FIG. 7 can be presented by the mobile communication device 116 by way of its display. For devices with large displays such as a tablet (e.g., iPAD™), the collateral information can provide users of the mobile communication device 116 flexibility to navigate and select hyperlinks if available.

In the present illustration, a graphical user interface (GUI) 701 is presented with the collateral information. The GUI 701 can be transmitted by the server 130 to the mobile communication device 116 or can represent a client application operating from the mobile communication device 116 for performing the functions described herein. The GUI 701 can include a drop-down menu 702 which the user can select to skip to collateral information associated with other scenes in the Harry Potter movie without having to wait for the STB 106 to detect the next time-sensitive code 610 embedded in streams 604 or 606.

Figure 8:
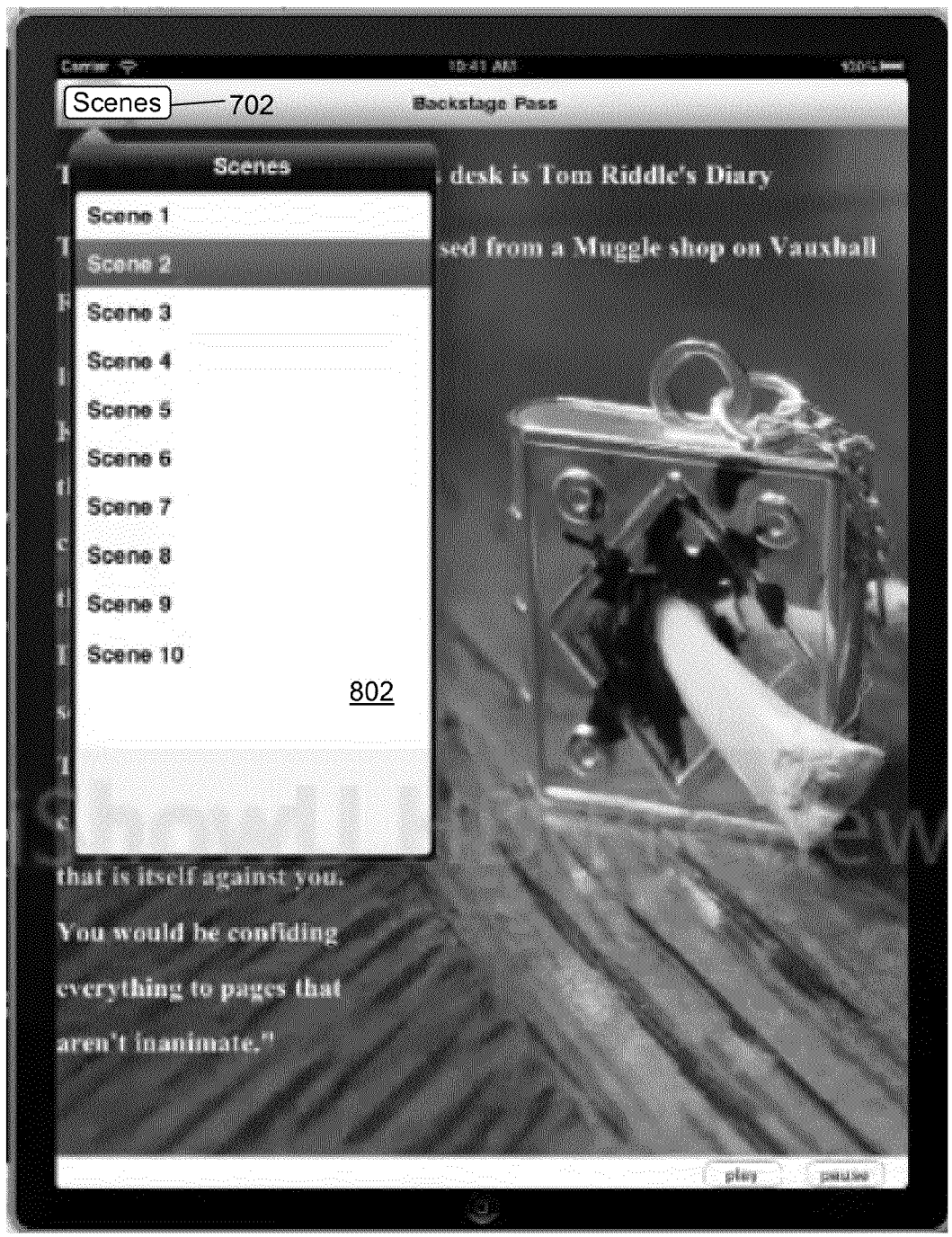
Figure 9:
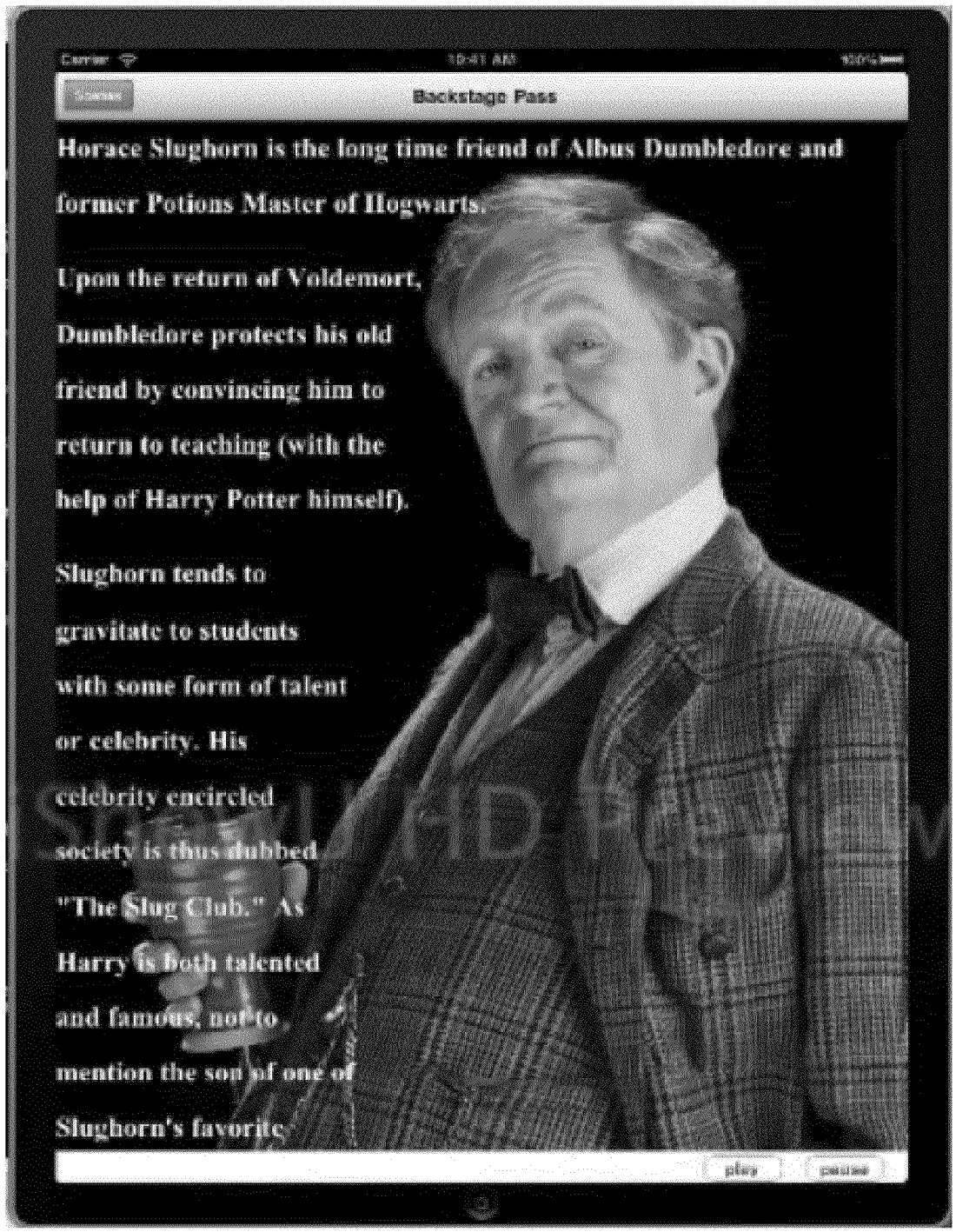

For example, a user can select the Scenes button 702 which displays the drop-down menu 802 shown in FIG. 8. From the drop-down menu 802 the user can select Scene 2 which can cause the mobile communication device 116 to transmit the detected selection at step 518 to the server 130. The server 130 can transmit to the mobile communication device 116 additional collateral information or e-commerce data at step 522 responsive to the selection information supplied by the mobile communication device 116. The server 130 can locate the additional collateral information from a selection code transmitted by the mobile communication device 116 that represents the drop-down menu selection. Alternatively, if the collateral information is displayed by the mobile communication device 116 as an HTTP web page, the user selection can result in an HTTP message transmitted to the server 130 representative of the item selected in the drop-down menu. The selection of Scene 2 via drop-down menu 802 of FIG. 8 can result in the presentation of FIG. 9, which in the present illustration describes another character in the Harry Potter movie (Horace Slughorn).

Figure 10:
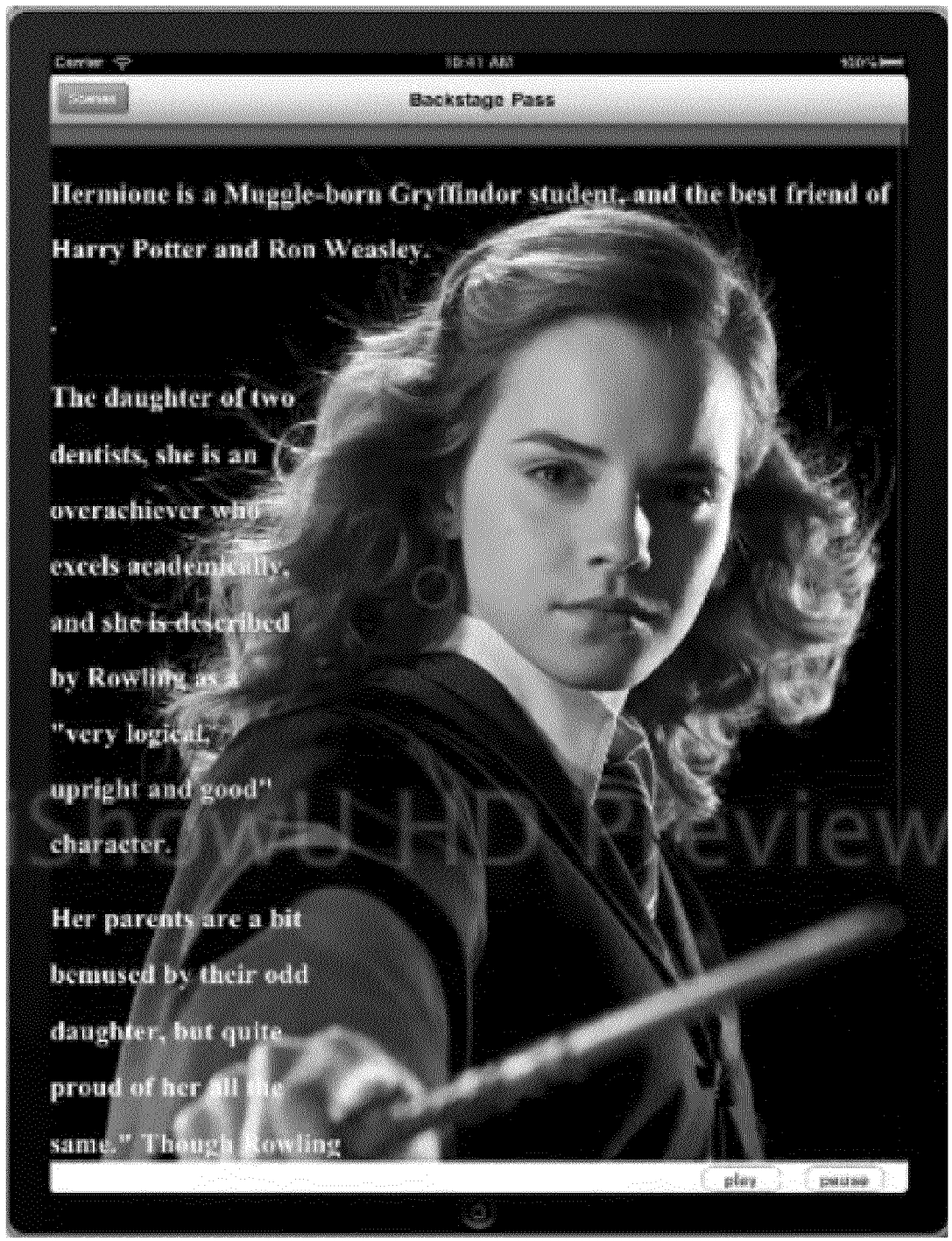
Figure 11:
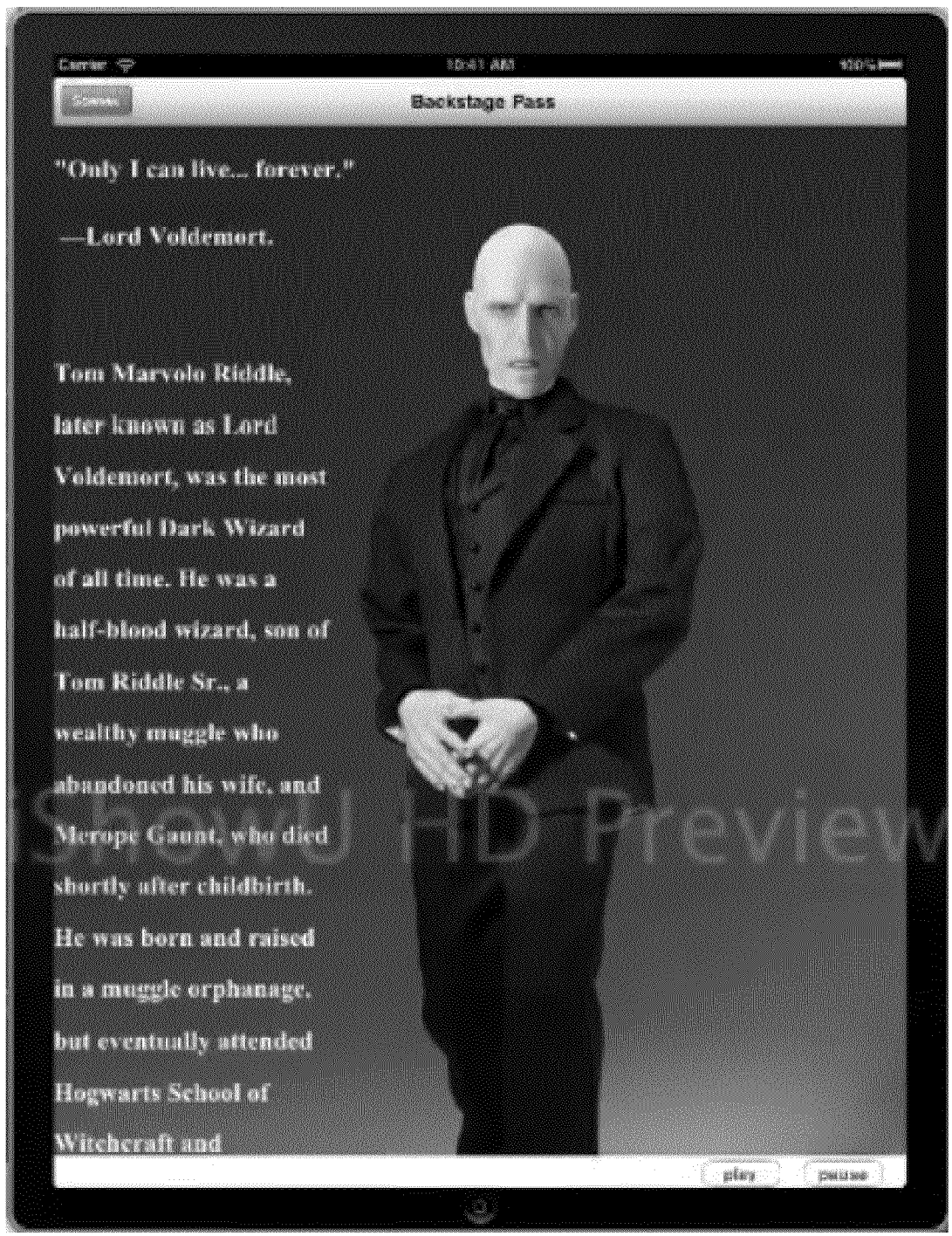
Figure 12:
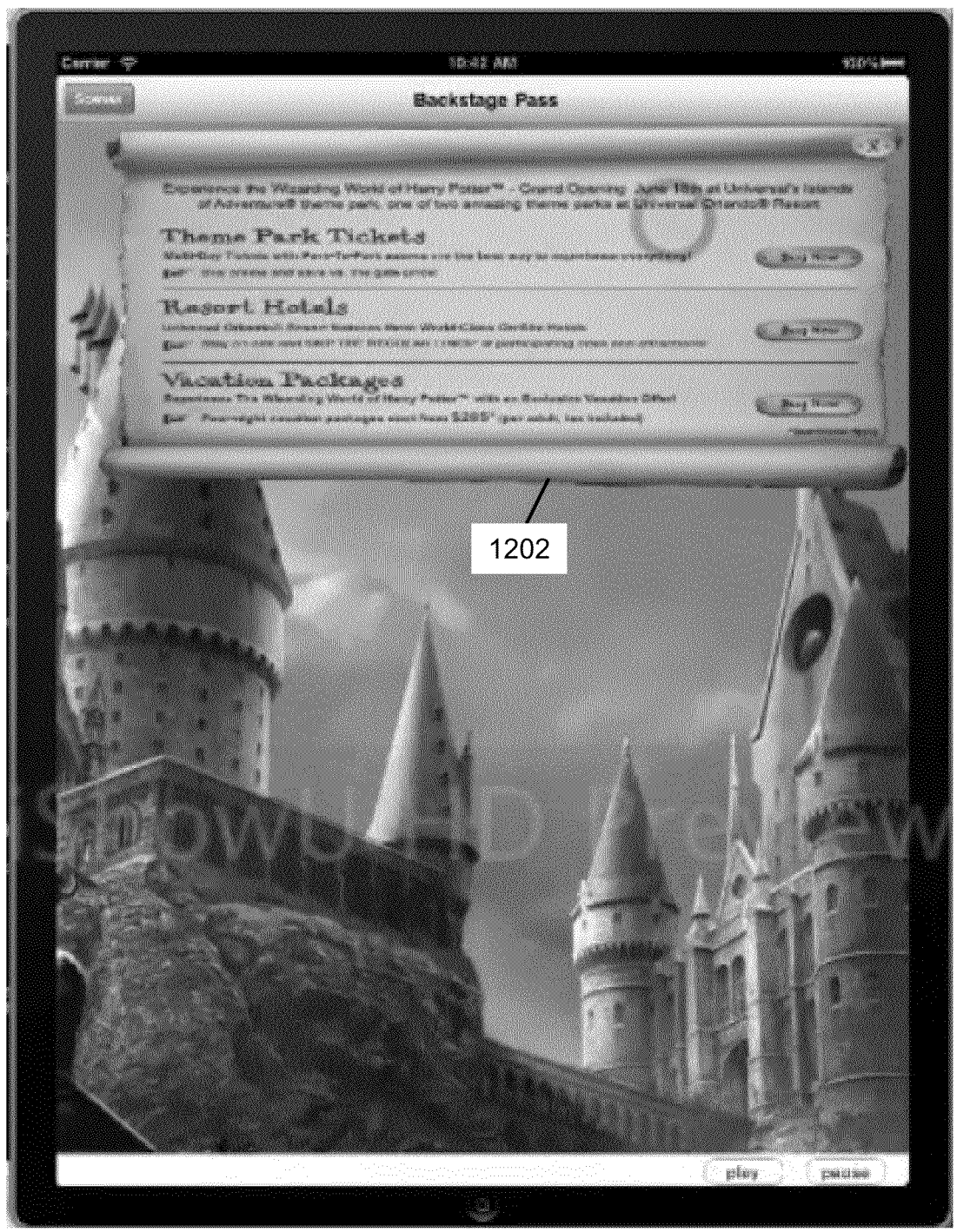
Figure 13:
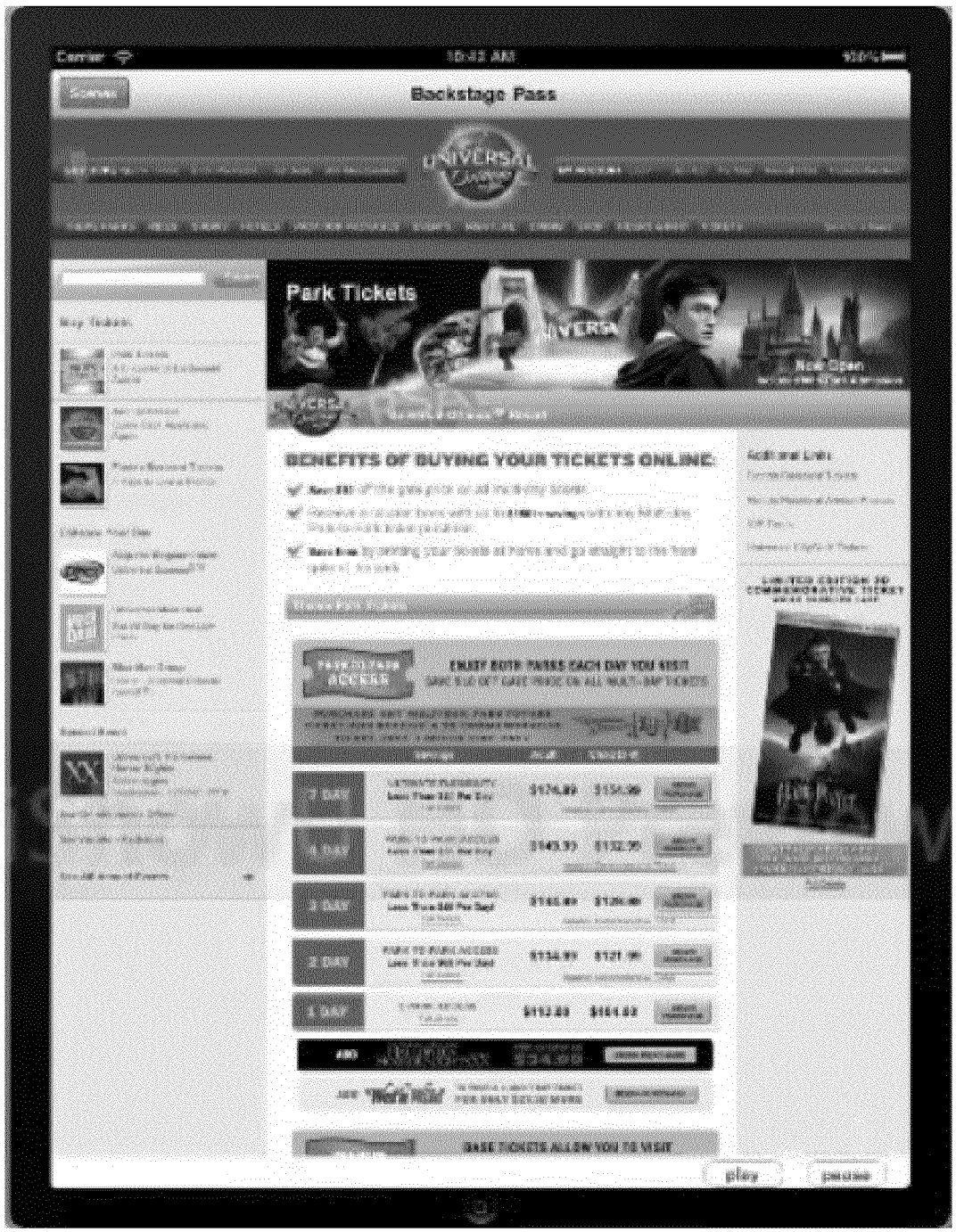

The presentation of collateral information at the mobile communication device 116 depicted by FIGS. 10, 11 and 12 can be the result of the STB 106 detecting other time sensitive codes 610 in the closed caption stream 606 or time codes stream 604. For example, the distributor of the media program can choose to include a time-sensitive code 610 at a timed location of the media program that depicts "Hermione." The STB 106 can transmit the detected time-sensitive code 610 to the server 130 which in turn transmits collateral information relating to the character to the mobile communication device 116 as shown in FIG. 10. The distributor may insert time-sensitive codes for other characters such as "Voldemort," when scenes relating to this fictional character arise in the media program presentation—see FIG. 11.

Figure 14:
Figure 15:

In addition to presenting collateral information in the form of biographies, the distributor of the media program can insert time-sensitive codes 610 in the streams 604 or 606 that invoke e-commerce collateral information such as shown in FIGS. 12, 13, 14 and 15. FIG. 12 can represent a webpage presented by the mobile communication device 116 with selectable GUI elements 1202 for purchasing theme park tickets at Universal Studios™. Presentation of FIG. 13 at the mobile communication device 116 can result from a selection of an item from GUI elements 1202 of FIG. 12. FIG. 14 can result from a time-sensitive code 610 detected by the STB 106 in streams 604 or 606 that prompts the server 130 to transmit to the mobile communication device 116 images of toys relating to the Harry Potter movie. The selection of the type of collateral toy information presented to the mobile communication device 116 can be context sensitive to the movie and to the user viewing the collateral information.

For example, the mobile communication device 116 can proactively identify the user to the server 130, or the server 130 can request a login and password to identify the user as previously mentioned. The server 130 can in turn search a subscriber account associated with the user to identify a user profile which can provide demographic, psychographic, or other useful information that describes the potential interests of the user. Producers of the collateral information can associate different options of collateral information to the same time-sensitive code 610. The server 130 can be adapted to select from the options according to a user's profile information.

Referring back to FIG. 7, the GUI 701 presented by the mobile communication device 116 can present options to control the presentation of the media program 608 at a TV set coupled to the STB 106. For example, the user can select Pause button 706 which causes the mobile communication device 116 to transmit a control message to the server 130, causing the server 130 in turn to direct the STB 106 to pause a presentation of the media program at step 526 (see FIG. 5). The user can resume the presentation by selecting the Play button 704 which causes the mobile communication device 116 to transmit another control message to the server 130, causing the server 130 to direct the STB 106 to resume the presentation of the media program at step 524.

In yet another embodiment, the mobile communication device 116 can be adapted in step 520 to monitor how long a user of the mobile communication device 116 is engaged in an uninterrupted visualization of the collateral information. The mobile communication device 116 can be adapted, for example, to monitor images of the user by way of a CCD camera 708 located on the same surface as the display from which the collateral information is viewed. The mobile communication device 116 can be adapted to utilize image processing technology to detect that the user's eyes have been visually focused on the collateral information in an uninterrupted manner for a period of time that exceeds a predetermined threshold (e.g., 10 seconds). The threshold can be set by the user or by the server 130 according to configurations established by a service provider of the collateral information.

If the mobile communication device 116 detects that the user has exceeded a visualization threshold at step 518, the mobile communication device 116 can transmit at step 526 a control message to the server 130 to cause the STB 106 to pause the media program. This embodiment provides an automated means to assist the user to avoid a noticeable loss of viewing time of the media presentation. The mobile communication device 116 can also be adapted to submit a request to the server 130 to resume presentation of the media program at step 524 upon detecting that the user has selected the Play button 704 or the user's eyes are detected to no longer be focused to the collateral information.

Upon reviewing the aforementioned embodiments, it would be evident to an artisan with ordinary skill in the art that said embodiments can be modified, reduced, or enhanced without departing from the scope and spirit of the claims described below. For example, method 500 can be adapted so that the server 130 ignores subsequent time-sensitive codes 610 transmitted by the STB 106 when it is evident that a user would not want to be interrupted with the viewing of collateral information. In one embodiment, the server 130 can make this determination by detecting activity by the user relative to an instance of collateral information. If the user, for instance, is navigating a web page provided by the server 130, the server 130 can make a reasonable assumption that the user would not like to be disturbed.

In another embodiment, the server 130 can be adapted to prompt the user to accept or receive new collateral information before replacing collateral information previously received by the mobile communication device 116. The user can be prompted with a pop-up screen super-imposed on the GUI 701 while presenting a previous instance of collateral information. In yet another embodiment, method 500 can be adapted and applied to the devices of communication system 200 of FIG. 2 and the web portal of FIG. 3. In yet another embodiment, the mobile communication device 116 can be adapted to communicate with the server 130 by way of the STB 106. In another embodiment, the mobile communication device 116 can be adapted to interact with the STB 106 without direct interaction with the server 130. In this embodiment, collateral information is managed by interactions between the STB 106 and the server 130. Other embodiments are contemplated by the present disclosure.

Figure 16:
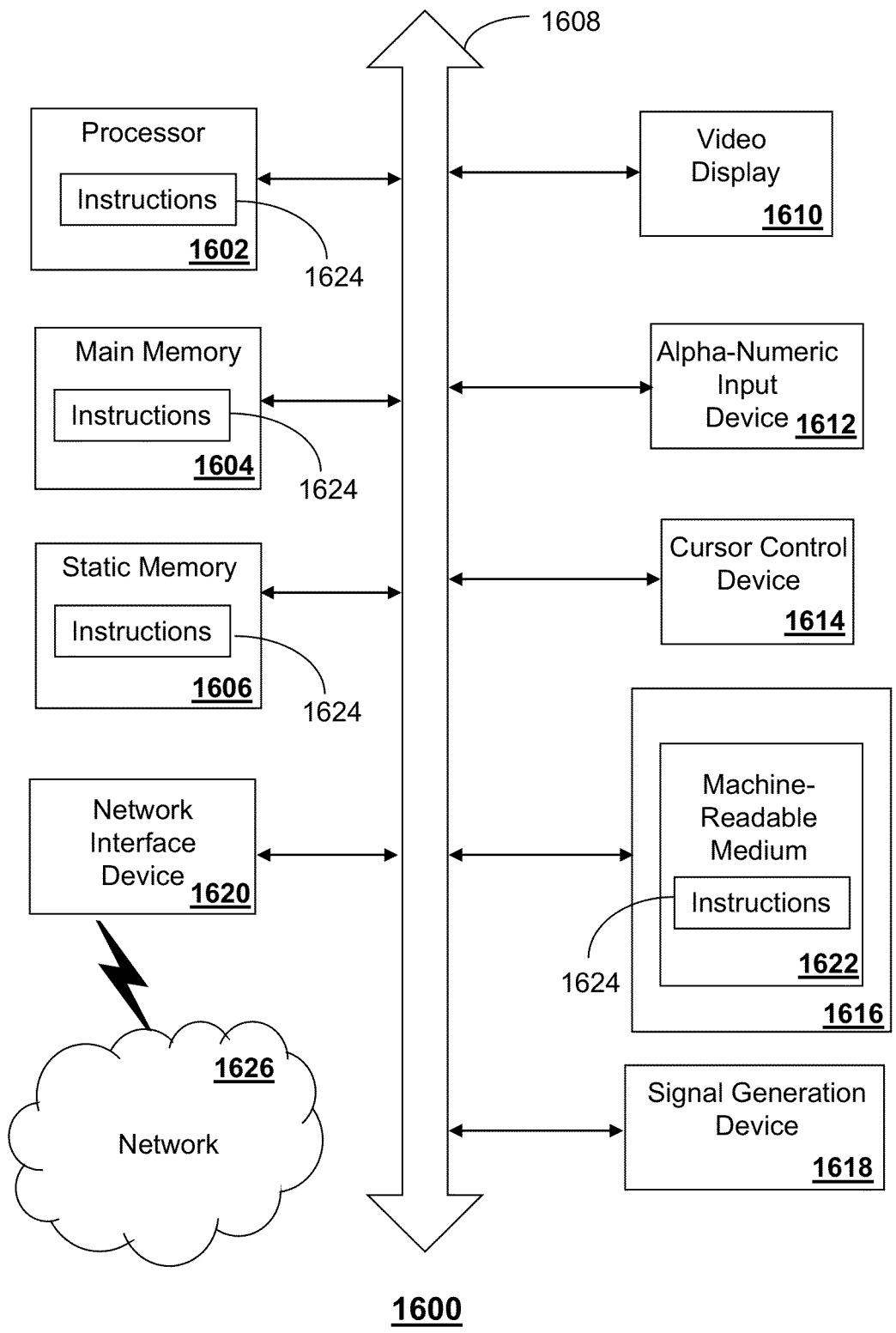
FIG. 16 is a diagrammatic representation of a machine in the form of a computer system within which a set of instructions, when executed, may cause the machine to perform any one or more of the methods discussed herein.

FIG. 16 depicts an exemplary diagrammatic representation of a machine in the form of a computer system 1600 within which a set of instructions, when executed, may cause the machine to perform any one or more of the methods discussed above. One or more instances of the machine can operate, for example, as the STB 106, the mobile communication device 116, and the server 130 or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1600 may include a processor 1602 (e.g., a central processing unit (CPU), a graphics processing unit (GPU, or both), a main memory 1604 and a static memory 1606, which communicate with each other via a bus 1608. The computer system 1600 may further include a video display unit 1610 (e.g., a liquid crystal display (LCD), a flat panel, or a solid state display. The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620.

The disk drive unit 1616 may include a tangible computer-readable storage medium 1622 on which is stored one or more sets of instructions (e.g., software 1624) embodying any one or more of the methods or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 1600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A set-top box, comprising:
 a memory to store computer instructions; and
 a processor coupled to the memory, wherein the processor, responsive to executing the computer instructions, performs operations comprising:
 receiving a video stream;
 detecting a time-sensitive code in the video stream;
 transmitting the time-sensitive code to a server for verification by the server that collateral information associated with the time-sensitive code satisfies a collateral information policy based on a specific channel, a specific viewing period, and a context of a scene in the video stream;
 responsive to the verifying that the collateral information satisfies the collateral information policy, transmitting by the server to a mobile communication device the collateral information associated with the context of the scene in the video stream being displayed through the set-top box and being associated with the time-sensitive code;
 receiving from the server a signal indicative of detected user visualization of collateral information at the mobile communication device being uninterrupted for a period of time that exceeds a predetermined threshold time period; and
 adjusting presentation of the video stream in response to the receiving of the signal.

2. The set-top box of claim 1, wherein the collateral information policy is provided by a source of the collateral information, and wherein the mobile communication device is a cellular telephone.

3. The set-top box of claim 1, wherein the time-sensitive code is embedded in closed caption data transmitted in the video stream, and wherein the operations further comprise suppressing a presentation of the closed caption data.

4. The set-top box of claim 1, wherein the time-sensitive code is embedded in time code data transmitted in the video stream.

5. The set-top box of claim 1, wherein the operations further comprise transmitting to the server a channel number of the video stream to enable transmission of the collateral information to the mobile communication device.

6. The set-top box of claim 1, wherein the collateral information corresponds to information in the scene including information associated with an animated object in the scene, information associated with an inanimate object in the scene, and advertisement contextually associated with the scene.

7. The set-top box of claim 1, wherein the adjusting of the presentation of the video stream comprises pausing the presentation of the video stream.

8. The set-top box of claim 1, wherein the operations further comprise:
 detecting the mobile communication device; and
 monitoring for a presence of the time-sensitive code in the video stream responsive to detecting the mobile communication device.

9. The set-top box of claim 1, wherein the detected user visualization comprises detecting from an image of a user that eyes of a user remain visually focused on the collateral information in an uninterrupted manner for the period of time that exceeds the predetermined threshold time period.

10. The set-top box of claim 1, wherein the video stream comprises a plurality of time-sensitive codes inserted in the video stream while the video stream is being transmitted to the set-top box.

11. A computer-readable storage device, comprising computer instructions, which when executed by a processor, cause the processor to perform operations comprising:
 receiving from a media processor a time-sensitive code embedded in a video stream received and being presented by the media processor at a presentation device;
 retrieving collateral information associated with a scene of the video stream according to the time-sensitive code, wherein a verification is performed that the collateral information satisfies a collateral information policy based on a context of the scene, a specific channel, and a specific viewing period;
 transmitting the collateral information to a mobile communication device responsive to the verifying that the collateral information satisfies the collateral information policy;
 receiving from the mobile communication device a first request responsive to a detected user visualization of the collateral information at the mobile communication device being uninterrupted for a period of time that exceeds a predetermined threshold time period; and
 transmitting, in response to the receiving of the first request, a second request to the media processor to cause the media processor to adjust presentation of the video stream.

12. The computer-readable storage device of claim 11, wherein the time-sensitive code is a context-sensitive code, and wherein the time-sensitive code is embedded in one selected from a group consisting of closed caption data and time code data transmitted in the video stream.

13. The computer-readable storage device of claim 11, wherein the operations further comprise:
 receiving from the media processor a channel number of the video stream; and
 transmitting the collateral information to the mobile communication device responsive to detecting a valid association between the channel number and the time-sensitive code.

14. The computer-readable storage device of claim 11, wherein the collateral information is selected from a group consisting of information associated with an animated object in the scene, information associated with an inanimate object in the scene, and advertisement contextually associated with the scene, and
 wherein the collateral information policy is provided by one of a producer of the collateral information, a producer of the animated object, a producer of the inanimate object, or a producer of the scene of the video stream.

15. The computer-readable storage device of claim 11, wherein the first request comprises a request to pause a presentation of the video stream, and wherein the transmitting of the second request to the media processor causes the media processor to pause the presentation of the video stream at the presentation device.

16. The computer-readable storage device of claim 15, wherein the first request is received responsive to the detected user visualization of the collateral information being uninterrupted for a predetermined period detected by the mobile communication device.

17. A communication device, comprising:
 a display;
 a memory to store computer instructions; and a processor in communication with the display and the memory, wherein the processor, responsive to executing the computer instructions, performs operations comprising:

receiving from a sever collateral information associated with a video stream received and being presented by a media processor responsive to the media processor detecting a time-sensitive code in the video stream, wherein a verification is performed by the server that the collateral information satisfies a collateral information policy based on a specific channel, a specific viewing period, and a context of a scene related to the time-sensitive code in the video stream;

presenting the collateral information at the display;

detecting user visualization of the collateral information at the display being uninterrupted for a period of time that exceeds a predetermined threshold time period; and transmitting to the server, in response to the detecting of the user visualization of the collateral information exceeds a threshold time period, a request to pause the presentation of the video stream at the media processor.

18. The communication device of claim 17, comprising an image sensor, wherein the detecting of the user visualization of the collateral information is by way of the image sensor, and wherein the transmitting of the request is responsive to the detecting of the user visualization of the collateral information being uninterrupted for a time period that exceeds a threshold.

19. The communication device of claim 17, wherein the collateral information policy is provided by a source of the collateral information.

20. The communication device of claim 17, wherein the operations further comprise:

detecting, subsequent to the request to pause the presentation, that the user visualization of the collateral information at the display has ceased; and providing, in response to the detecting that the user visualization has ceased, a request to resume the presentation of the video stream.

* * * * *